United States Patent [19]
Berhaut-Streel

[11] Patent Number: 5,445,331
[45] Date of Patent: Aug. 29, 1995

[54] DEVICE FOR PROCESSING PLASTIC ARTICLES OF ELONGATED SHAPE, AND AN INSTALLATION USING THE DEVICE FOR THE SELECTIVE RECOVERY OF PLASTICS

[75] Inventor: Jacques Berhaut-Streel, Hoorn, Netherlands

[73] Assignee: Draka Polva B.V., Amsterdam, Netherlands

[21] Appl. No.: 171,474

[22] Filed: Dec. 23, 1993

[30] Foreign Application Priority Data

Sep. 8, 1993 [BE] Belgium .............................. 09300932

[51] Int. Cl.⁶ .................... B02C 23/10; B02C 1/06
[52] U.S. Cl. ................. 241/79.1; 241/101.2; 241/101.4; 241/152.2; 241/266
[58] Field of Search ............... 241/101.2, 101.4, 99, 241/101.7, 266, 79.1, 152.2, 79, 199

[56] References Cited

U.S. PATENT DOCUMENTS

| | | | |
|---|---|---|---|
| 2,150,984 | 3/1939 | Near et al. | 241/101.4 |
| 3,285,163 | 11/1966 | Burner | 241/101.4 X |
| 4,795,103 | 1/1989 | Lech | 241/99 X |
| 4,923,126 | 5/1990 | Lodovico et al. | 241/99 X |
| 4,932,595 | 6/1990 | Cohen et al. | 241/99 |
| 4,987,829 | 1/1991 | Hudson et al. | 241/99 X |
| 5,102,057 | 4/1992 | Ellis, III | 241/99 |
| 5,269,474 | 12/1993 | Reis et al. | 241/101.2 |

FOREIGN PATENT DOCUMENTS

| | | |
|---|---|---|
| 0249094 | 12/1987 | European Pat. Off. |
| 0481537A1 | 4/1992 | European Pat. Off. |
| 1964111 | 12/1969 | Germany |
| 9101705 | 5/1993 | Netherlands |

OTHER PUBLICATIONS

Kunststoffe, vol. 80, No. 8, Aug. 1990, Munchen DE pp. 883–884, Dipl.-Ing. Viktor Hess 'Zerkleinern von Extrudierten Rohren und Profilen'.

Plastiques Modernes et Elastomers, vol. 31, No. 4, May 1979, Paris FR, pp. 67–70, 'Regeneration: Por Chaque Cas un Materiel Specifique'.

Caoutchoucs et Plastiques, vol. 68, No. 702, Jan. 1991, Paris FR, pp. 77–79, J. M. 'Peripheriques: Les Broyeurs a Couteaux –Le Brotage Un Facteur D'Economies'.

Database WPI, Section Ch, week 9102, Derwent Publication Ltd., London, GB; class AC AN 91–012865 CO2! & SE-A-8 901 207 (Maskin Ab Rapid) 6 Oct. 1990.

Kunststoffberater, vol. 37, No. 4, Apr. 1992, Isernhagen, Germany, pp. 70–72, Herbold BmbH 'Machinen und Anlagen Zum Zerlkeinern und Recyceln von Kuntststoffabfallen', pp. 70–71.

Caoutchoucs et Plastiques, vol. 66, No. 684, Jan. 1989, Paris FR, pp. 73–74; 'Recyclage des Dechets Platiques'.

*Primary Examiner*—Timothy V. Eley
*Attorney, Agent, or Firm*—Spencer, Frank & Schneider

[57] ABSTRACT

Device and method for processing plastic articles, comprising a side-acting press followed by a shear. The device and the process may advantageously be applied to articles of elongate shape, such as pipes, which are firstly squashed by the press and then cut up by the shear, which leads to the formation of fragments, the morphology and geometry of which depend on their nature, which facilitates the subsequent classification thereof.

11 Claims, 4 Drawing Sheets

DEVICE FOR PROCESSING PLASTIC ARTICLES OF ELONGATED SHAPE, AND AN INSTALLATION USING THE DEVICE FOR THE SELECTIVE RECOVERY OF PLASTICS

BACKGROUND OF THE INVENTION

The present invention relates to a method and a device for processing plastic articles, in particular articles of elongate shape such as pipes, enabling these articles to be reduced into small-sized fragments, so as subsequently to classify these fragments according to their nature.

The recycling of plastic articles nowadays constitutes a particularly important activity for the producers of these articles. One of the problems which arise during recycling is the classification of the various plastics collected; indeed, the possibility of reusing them is directly related to their purity, which depends directly on the quality of the classification.

Within this framework, various solutions have already been proposed. Thus, in Patent Application NL 9,101,705, an installation is described for recycling plastic articles which essentially comprises a crusher and a screen. The crusher subjects the articles to be processed to violent impacts, which reduces them to pieces whose smallness decreases with the brittleness of their constituent material. Screening therefore enables the fragments to be classified according to their size and therefore, indirectly, according to the nature of the constituent material of the processed article.

However, this known technique has many drawbacks. Indeed, some plastics, such as, especially, rubber, polyethylene (PE) and polypropylene (PP), are difficult to crush compared to others, such as, for example, polyvinyl chloride (PVC). In the case of not very brittle plastic articles, for example in the case of polyethylene pipes, this known method does not work very well and rapidly leads to blockage of the crusher, which fails to shatter the articles. This risk of blockage is increased particularly if the articles to be processed consist of a plastic reinforced by means of reinforcing fibres, for example glass fibres. Consequently, it is understood that, in order for it to operate correctly, this known method must necessarily be preceded by a prior step of manually sorting the articles, which step constitutes a significant disadvantage thereof.

Furthermore, this known method is difficult to apply to large-sized articles: it is, for example, impossible to introduce, into a normal-sized crusher, pipes of 6 m in length, which, however, constitutes a standard length for pipes. In this case a prior step of cutting up the pipes is necessary, unless a crusher of exceptional size is used. Both these solutions are disadvantageous from the economic standpoint.

An additional disadvantage of this known method is the high noise level which it generates.

SUMMARY OF THE INVENTION

Consequently, the object of the present invention is to provide a method and a device for processing plastic articles making it possible to process especially articles consisting for the most part of a not very brittle plastic, which can be applied to very long pipes, and making it possible to classify, according to their nature, the plastics thus collected with a view to a subsequent reuse.

More specifically, the present invention relates to a method for processing plastic articles with the expectation of classifying them, in which the said articles are squashed and then cut up.

Preferably, the articles are squashed transversely in relation to their largest dimension.

By plastic is meant any polymer and any mixture of polymers, possibly comprising one or more additives and/or reinforcing materials. The intended polymers may be both thermosetting polymers and thermoplastic polymers; among the latter, mention may be made especially of polyolefins, such as PP and PE, and vinyl polymers, such as PVC. By plastic is also meant the polymers used alone or as mixtures, as well as those which contain additives such as pigments, plasticizers, antioxidants, filler materials, etc. These polymers may also contain reinforcing materials, for example glass or carbon fibres.

The intended articles may have been produced from one or more of the abovementioned plastics by any implementation method, for example by extrusion, coextrusion, calendering, rolling, etc. Hollow bodies, most especially extruded and coextruded pipes, constitute the types of articles to which the invention may be applied most advantageously, without these examples being limiting. The invention advantageously applies to the processing of articles which comprise at least one pipe.

Nothing prevents the articles thus processed from comprising several parts, consisting of identical or different plastics; for example they may be PE or PVC pipes fitted with seals consisting of an elastomer, such as rubber.

The present invention also relates to a device for processing plastic articles, comprising a side-acting press followed by a shear, in which device the method according to the invention may be carried out. This side-acting press and this shear may advantageously be combined into a single apparatus ("press-shear").

The side-acting press, known in its principle and described, for example, in document EP 481,537, includes a longitudinal container in which it is possible to place, parallel to its longitudinal axis, one or more articles of elongate shape, such as pipes, as well as one or more lateral pressing means enabling these articles to be squashed laterally, that is to say transversely in relation to their largest dimension. This lateral squashing may be obtained by the application of forces acting in any direction substantially perpendicular to the longitudinal axis of the press, for example by the application of horizontal or vertical forces. These lateral forces may especially be applied by means of one or more jaws extending over the entire length of the press, parallel to its longitudinal axis. Each of these jaws may be articulated about a pin, or alternatively be designed to move parallel to itself in the manner of a piston. A press fitted with articulated jaws is particularly compact, and therefore advantageous. The lateral forces may also be applied by a horizontal piston forming the top side of the container of the press, in the manner of a lid. These jaws and/or pistons may be actuated by any known means, such as hydraulic rams, motors which may or may not be combined with gear systems, etc.

This lateral squashing has different consequences depending on the nature of the articles: the articles consisting of brittle plastics, such as PVC, fracture (that is, brittle fracture) whereas those consisting of non-brittle plastics, such as PE, are squashed laterally but very rarely fracture (that is, plastic deformation). Thus, for example, PVC pipes will generally shatter, giving rise to numerous long and narrow strips, whereas PE pipes will become squashed on themselves and will exhibit only very few fractures.

This lateral squashing step has several advantages: thus, as explained hereinabove, it leads either to fracture or to squashing, depending on the nature of the articles. Next, it makes it possible to process articles of large cross-section, for example pipes whose diameter is greater than the entrance cross-section of the shear described hereinabove. Furthermore, it enables several articles to be processed simultaneously. Moreover, this squashing step has the advantageous consequence of detaching from the processed articles a large part of the dirt accumulated on their surface and inside them (sand, earth, dust, traces of dried liquids, etc.). Separation of the dirt thus detached will be very easy to carry out thereafter, for example by means of a vibrating screen.

The press also includes means for moving the articles, which enables them to be progressed towards the shear described hereinbelow. These movement means may, for example, consist of a piston perpendicular to the axis of the press and which can move parallel to this axis. This piston may form one of the vertical sides of the container for receiving the articles.

The side-acting press is immediately followed by a shear, generally placed on the axis of the press. By shear is meant one or more cutters, at least one of which is moved in a plane substantially perpendicular to the axis of the apparatus. This movement may especially be a periodic alternating translational movement, the cutter moving in its plane, parallel to itself, or a rotational movement, the cutter pivoting about an axis perpendicular to itself, in an alternating or continuous manner.

After the lateral squashing step in the press, the means for moving the articles progress the squashed articles towards the cutter or cutters, which cut them up longitudinally.

In addition to the lateral squashing, this cutting-up does not have the same consequences for all the plastics: brittle plastics, such as PVC, undergo brittle fracture, whereas non-brittle plastics such as PE, are essentially cut. The specific morphology and geometry of the fragments of brittle plastic, especially PVC, will advantageously be exploited for the selective recovery of these materials.

Contrary to the known method described hereinabove, using a crusher, the result of the above is that the length of the fragments collected after exiting the press-shear used in the present invention is strictly limited; it is, in fact, directly related to the operating frequency of the shear and to the speed of longitudinal advance of the articles. In practice, the length of the fragments is typically of the order of 5 to 50 cm, preferably of 10 to 30 cm. This limitation in the length of the fragments reduces any risk of blockage of the device of the invention, as well as of possible apparatuses placed downstream thereof, such as those described hereinbelow.

Moreover, using only compressive and cutting forces, and not impact forces, this method is relatively quiet to implement.

Before squashing the articles transversely in relation to their largest dimension and cutting them up, it is possible to squash them parallel to this dimension. When the means for moving the articles consist of a piston located opposite the shear, the piston may serve to carry out this longitudinal squashing, that is to say may subject the articles placed in the container of the press to longitudinal pressure, between the piston on the one hand and the (closed) shear on the other hand, both these elements being placed at an opposite end of the container. In order to prevent the cutters of the shear being subjected to excessive lateral forces, which would risk them being damaged, it is possible to provide, at the end of the container of the press, immediately in front of the shear, a thick, movable vertical plate which can act as a stop during the longitudinal pressure of the articles. Under the effect of this longitudinal pressure, the articles consisting of a brittle plastic, such as PVC, shatter, whereas those consisting of a non-brittle plastic, such as PE, are simply deformed elastically and/or plastically in the longitudinal direction. This preliminary step of longitudinal compression makes it possible to reduce the work which the shear must subsequently provide.

As explained previously, the combination of a press and a shear, such as those described hereinabove, is particularly advantageous in an installation for selective recovery of plastics, comprising a classifying device. Indeed, the squashing and cutting-up, described hereinabove, produce plastic fragments which lend themselves particularly well to the subsequent steps whose purpose is the classification of the plastics according to their nature, and most particularly the selective recovery of PVC. An example of such a subsequent step is the selective screening which enables brittle plastics to be easily separated from non-brittle ones, because of the difference in size of the fragments collected after squashing and cutting-up. Another example of this subsequent step is the crushing and/or the micronization which produces small-sized plastic fragments, typically of the order of one centimetre or even of one millimeter, which fragments may thereafter be separated by physico-chemical methods, such as flotation or electrostatic separation.

The invention consequently relates also to an installation for the selective recovery of plastics, comprising a device according to the invention.

The installation according to the invention generally comprises, downstream of the side-acting press and the shear which are described hereinabove, one or more processing "cells", the plastic fragments being transported from one to the other by conventional transporting means, for example by conveyor belts.

A first type of such a processing cell consists of a vibrating screen making it possible to remove the small particles, such as dust, earth or sand, which could adhere to the fragments collected after exiting of the shear. Such a vibrating screen is advantageously placed after the shear. One or more additional vibrating screens may furthermore be placed at other points throughout the device.

A second type of such a processing cell, advantageously placed after a vibrating screen positioned after the shear, consists of a belt transporter along which the fragments move and where these undergo visual inspection during which foreign bodies are separated from the fragments of recyclable plastics. These foreign bodies are especially plugs, inserts, seals, etc., which their nature excludes from the recycling process. This visual inspection may be carried out by a human operator or automatically, for example by means of a camera connected to an image-recognition system and to one or more robotized arms making it possible to remove objects considered as harmful for the remainder of the recycling. In the case of pipes fitted with seals perpendicular to their axis, it should be noted that the structure of the press and of the shear is such that these seals are generally not shattered, which facilitates their identification and removal.

A third type of processing cell consists of a cell for recovering the ferromagnetic materials by means of a magnetic field produced by one or more electromagnets.

Another type of processing cell consists of a crusher. This crusher may be of any type, for example a rotary model in which the fragments to be crushed are projected at high speed against its walls. This crusher may be of modest size, given that the fragments which are introduced into it are, as explained previously, of strictly limited size, of a few tens of centimeters at the very most. This situation contrasts with the prior method described above, which necessitated the use of an enormous crusher into which the entire articles to be processed could be introduced. The fragments produced by the crusher are generally of small size, for example of the order of one centimeter.

Another type of cell which can be used, placed downstream of a possible crusher, consists of a grinder with cutters, or micronizer, which reduces the crushed fragments into a powder of fine particle size, for example of a mean diameter not exceeding a few millimeters.

The installation according to the invention may advantageously comprise, in addition to the press and shear, a crusher and/or a micronizer.

The classification of the plastics according to their nature may involve various means and various steps throughout the processing. Thus, the classification may be performed by human or automatic, visual inspection based on the fracture morphology and the geometry of the fragments after exiting the shear, these being clearly different for PVC and PE, for example. The classification may also be performed by screening, after exiting the shear, based on the difference in size of the fragments. It may also be undertaken, after crushing and possible micronization, by physico-chemical methods, such as flotation or electrostatic separation.

The appended figures illustrate, in a non-limiting fashion, various embodiments of the device of the invention.

DETAILED DESCRIPTION OF THE INVENTION

In these figures, identical reference numbers designate identical elements.

Figure 1:
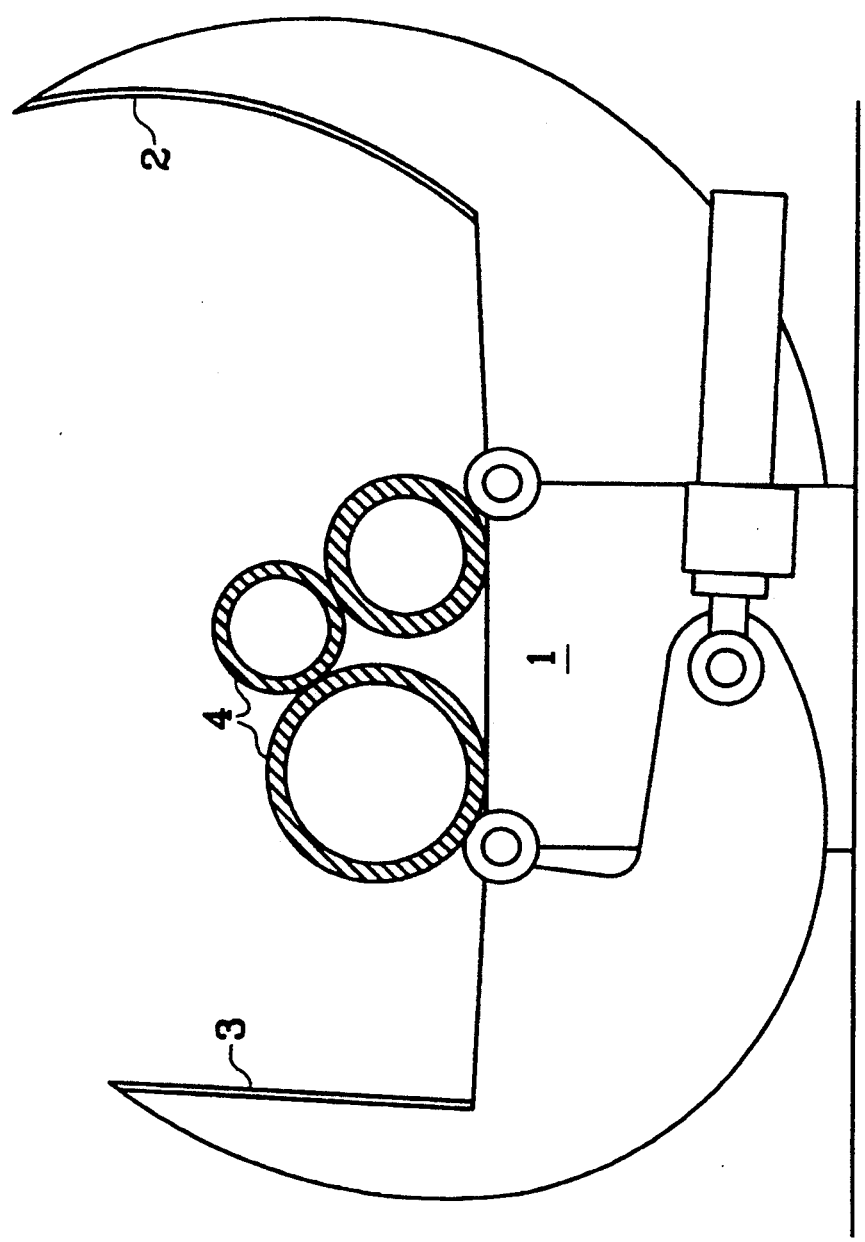
FIG. 1 represents, in section, a particular type of press in accordance with the invention, into which articles to be processed have been deposited.
Figure 2:
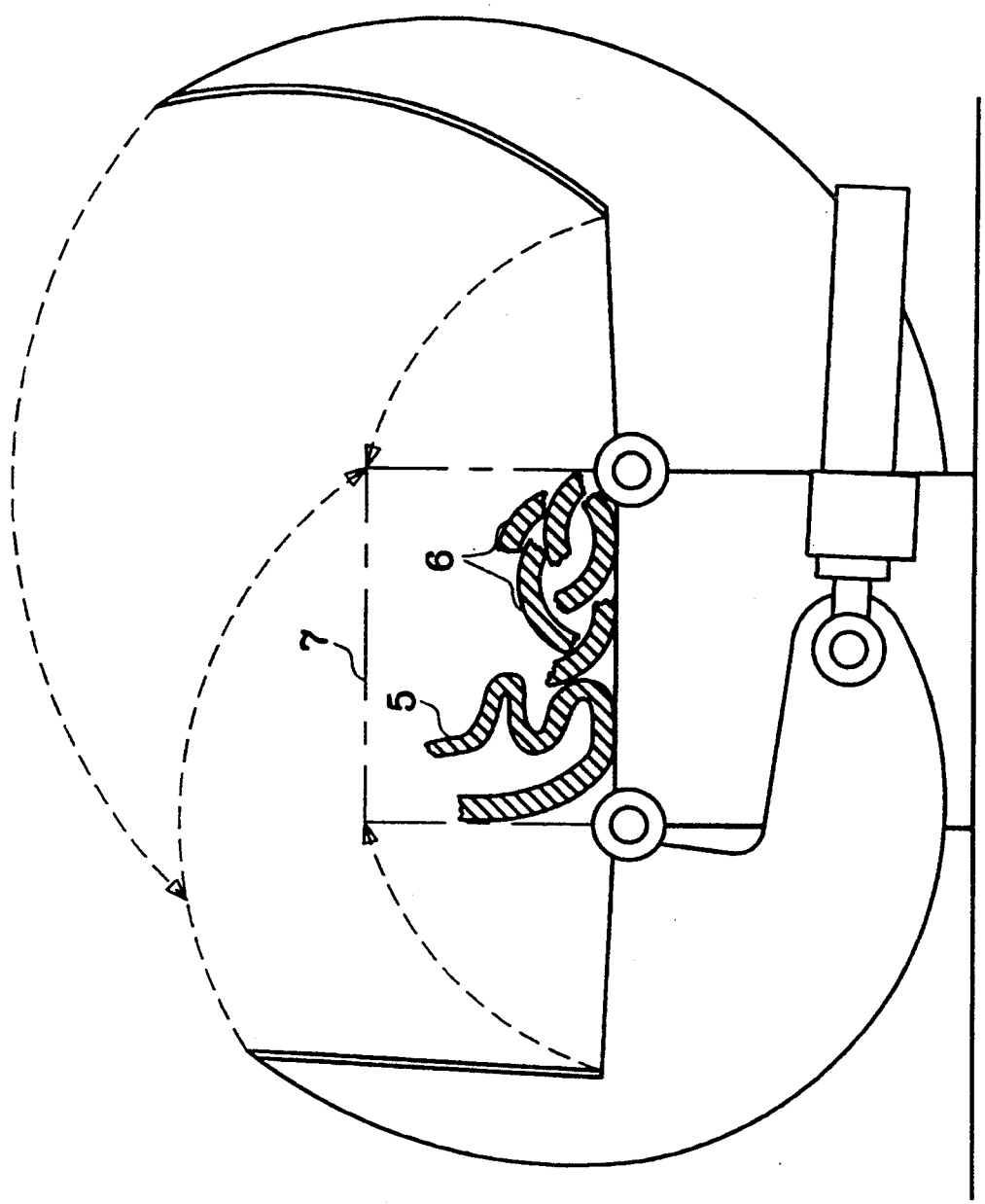
FIG. 2 represents the press of FIG. 1 after the articles which it contains have been squashed laterally.

The press shown in FIGS. 1 and 2 comprises an elongate container (1) over the entire length of the sides of which are articulated two jaws (2, 3). In FIG. 1, the jaws of the press are open, and three pipes (4) to be processed have been deposited into the container formed from these jaws and the frame of the press.

FIG. 2 shows the situation after lateral squashing and reopening of the jaws: the jaws (2, 3) were closed up again so as to match the bounds of the rectangle (7) shown in dot/dash lines, consequently squashing the pipes. A plastically deformed pipe (5) and fragments of pipes (6) suffering brittle fracture may be seen in FIG. 2.

Figure 3:
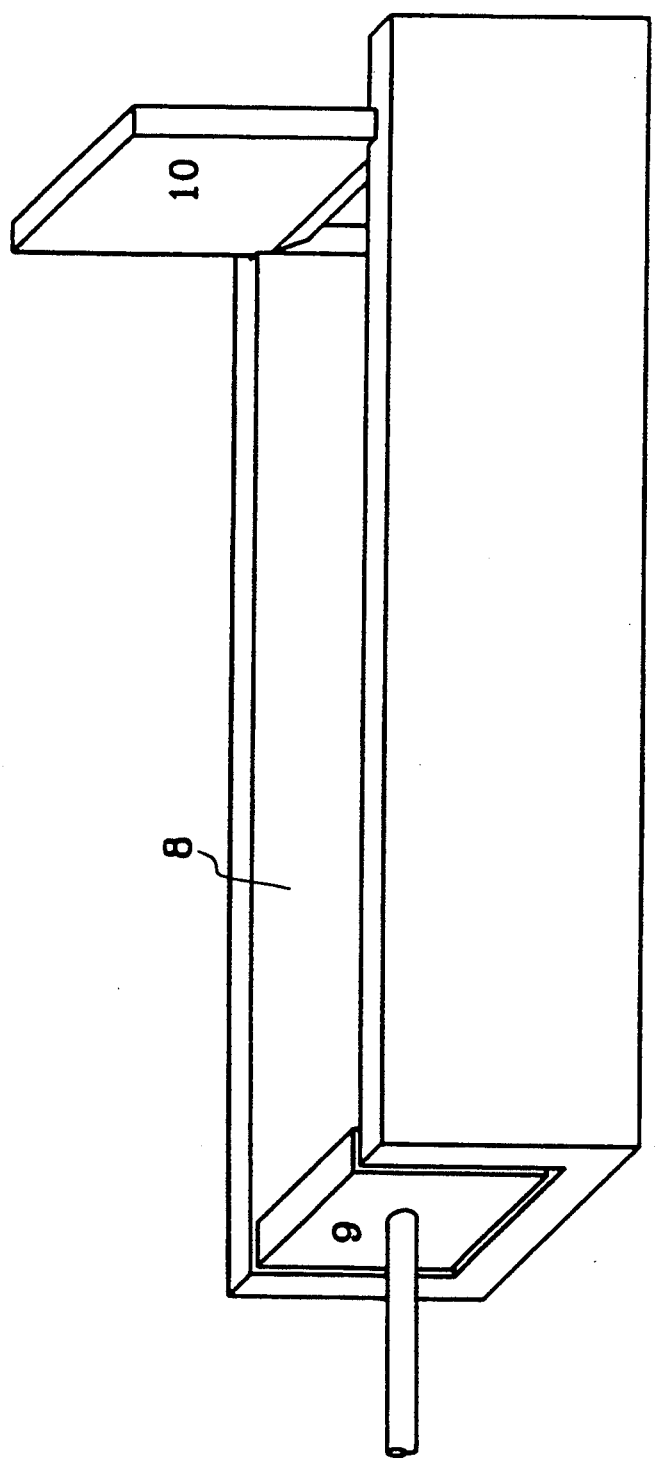
FIG. 3 represents, in perspective, and diagrammatically, a particular variant of a press-shear in accordance with the invention.

A press combined with a shear, that is to say a press-shear, in accordance with the invention, may be seen in FIG. 3. Here, the press is a model different from than that shown in FIGS. 1 and 2: it amounts to a simple elongate container (8), one end of which is closed by a vertical piston (9) intended for the movement of the articles placed in the container (8), this piston being able to move parallel to the longitudinal axis of the container (8) under the effect of a conventional hydraulic ram (not shown), and the other end of which is closed by a shear comprising a single vertical blade (10) which can move in a vertical plane under the effect of other conventional hydraulic means (not shown). The lateral squashing means, which have not been shown, consist here of a horizontal piston of vertical axis, closing the top side of the container (8) once the latter has been filled with articles to be processed, and intended to exert vertical pressure on these articles.

After having placed the articles to be processed into the container (8) and having closed the "lid" which the horizontal piston constitutes, but before the latter squashes the articles laterally (vertically), the vertical piston (9) is actuated so as to compress the articles longitudinally, which will shatter those of them made of a brittle plastic.

Figure 4:
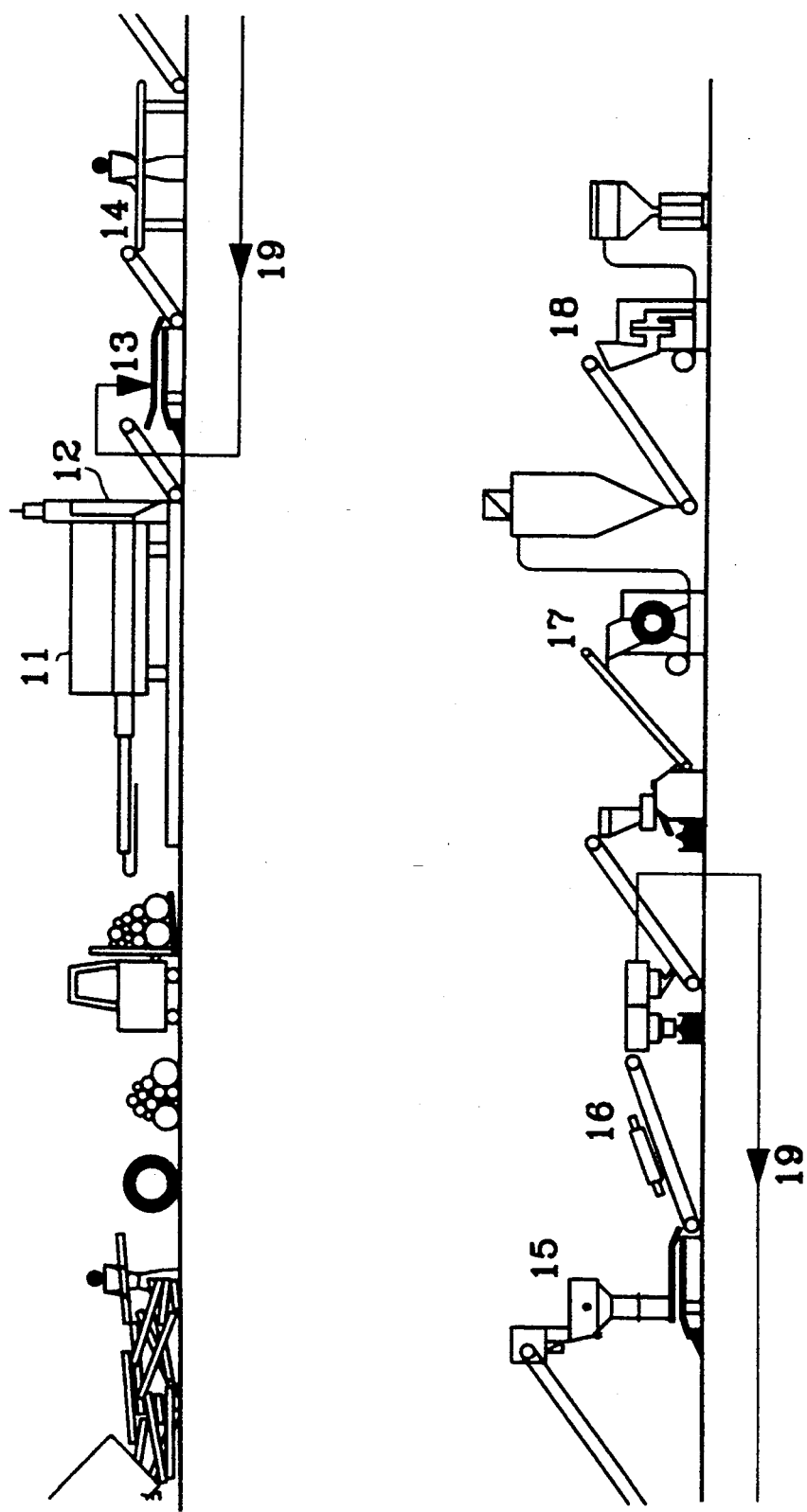
FIG. 4 represents diagrammatically an installation for the selective recovery of plastics according to the invention.

FIG. 4 represents diagrammatically a particular configuration of a complete installation for recycling plastic pipes; the bottom part of the figure shows the second half of the installation, which is positioned to the right of the first half, represented in the top part of the figure. After being discharged, (on the left of the top part of FIG. 4), the pipes are squashed longitudinally and then laterally in a press (11) in accordance with the invention, and are then cut up by a shear (12) according to the invention. The plastic fragments thus obtained are stripped of most of the impurities, such as sand, earth, etc., by a vibrating screen (13) before passing onto a conveyor belt (14) where they are subjected to a visual inspection so as to remove therefrom the foreign bodies unsuitable for recycling. The fragments are then led into a crusher (15) and the crushed fragments thus obtained, of a size of the order of one centimeter, pass beneath an electromagnet (16) so as to remove therefrom possible ferromagnetic foreign bodies, such as inserts. After one selective-screening step, enabling the previous steps to be reapplied, and, in particular, the crushing, into sufficiently small fragments, as is symbolized by the arrow (19), the other crushed fragments are transferred into a grinder (17) and then into a micronizer (18). The fine plastic particles thus obtained are then classified in an electrostatic separator (not shown).

I claim:

1. A device for processing plastic articles, comprising:

a side-acting press having a longitudinal axis, and having a plurality of jaws each extending along an entire length of said press parallel to the longitudinal axis, said jaws being movable for squashing the plastic articles in a direction substantially perpendicular to the longitudinal axis; and at least one cutter operatively connected in series and subsequent to said press and movable in a plane substantially perpendicular to the longitudinal axis.

2. The device as defined in claim 1, wherein said press and said at least one cutter combined into a single apparatus.

3. The device as defined in claim 1, wherein said press comprises a piston having a face arranged perpendicularly to the longitudinal axis, said piston being movable along the longitudinal axis.

4. An installation for the selective recovery of plastics, comprising:
   a device for processing plastic articles, including:
      a side-acting press having a longitudinal axis, and having a plurality of jaws each extending along an entire length of said press parallel to the longitudinal axis, said jaws being movable for squashing the plastic articles in a direction substantially perpendicular to the longitudinal axis; and
      at least one cutter operatively connected in series and subsequent to said press and movable in a plane substantially perpendicular to the longitudinal axis.

5. The installation as defined in claim 4, further comprising a crusher for crushing the squashed plastic articles and arranged subsequent to said device for processing, and a grinder having cutters arranged subsequent to said crusher.

6. The installation as defined in claim 4, further comprising a crusher for crushing the squashed plastic articles and arranged subsequent to said device for processing, and a micronizer arranged subsequent to said crusher.

7. The installation as defined in claim 4, further comprising at least one of a grinder having cutters and a micronizer, each being arranged subsequent to said device for processing.

8. The installation as defined in claim 4, further comprising a flotation separator of plastics arranged subsequent to said device for processing.

9. The installation as defined in claim 4, further comprising a electrostatic separator of plastics arranged subsequent to said device for processing.

10. The installation as defined in claim 4, wherein said press and said at least one cutter are combined into a single apparatus.

11. The installation as defined in claim 4, wherein said press comprises a piston having a face arranged perpendicularly to the longitudinal axis, said piston being movable along the longitudinal axis.

* * * * *